United States Patent
Cheng

(10) Patent No.: US 7,237,031 B2
(45) Date of Patent: Jun. 26, 2007

(54) METHOD AND APPARATUS FOR CACHING PROTOCOL PROCESSING DATA

(75) Inventor: Charles T. Cheng, Milpitas, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 777 days.

(21) Appl. No.: 10/093,308

(22) Filed: Mar. 7, 2002

(65) Prior Publication Data

US 2003/0172169 A1 Sep. 11, 2003

(51) Int. Cl.
*G06F 15/16* (2006.01)

(52) U.S. Cl. ...................... 709/230; 709/236

(58) Field of Classification Search ............... 709/230
See application file for complete search history.

(56) References Cited

U.S. PATENT DOCUMENTS 5,761,417 A * 6/1998 Henley et al. ............. 709/231
6,807,581 B1 * 10/2004 Starr et al. ................. 709/250

OTHER PUBLICATIONS

James Kurose, Computer Networking, A Top-Down Approach Featuring the Internet, Addisson wesley Longman, 2001 p. 197-205.*

Kurose, James F. and Ross, Keith W. "Computer Networking: A Top-Down Approach Featuring the Internet," 2001, Addison Wesley, pp. 210-211.*
Information Sciences Institute, "Transmission Control Protocol; Darpa Internet Program Progotocol Specification," Sep. 1981, University of Southern California, pp. 1-85.*

* cited by examiner

*Primary Examiner*—Jason Cardone
*Assistant Examiner*—Azizul Choudhury
(74) *Attorney, Agent, or Firm*—Park, Vaughan & Fleming, LLP

(57) ABSTRACT

A method and apparatus are provided for caching data for protocol processing. A protocol processing cache stores data needed for the generation of new headers, from both receive and transmit flows. Some data may be stored in the cache only after being processed (e.g., updated, calculated) by a protocol processor. Other data may bypass the protocol processor and be stored in the cache without being handled by the protocol processor. An entry in the cache includes data needed for header generation, a tag identifying an index into a control block memory of the TCP connection to which the data corresponds. An entry may also include one or more control indicators to indicate whether a transmit flow has been acknowledged, whether a receive flow has been observed, and whether the transmit flow has been updated with control data from the receive flow. The apparatus is protocol processor independent.

21 Claims, 7 Drawing Sheets

METHOD AND APPARATUS FOR CACHING PROTOCOL PROCESSING DATA

BACKGROUND

This invention relates to the field of data communications. More particularly, a method and apparatus are provided for improving the performance of protocol processing by caching data required for the processing.

Data communications are typically formatted according to a hierarchy of communication protocols (e.g., as specified by ISO-OSI and/or other standards) in order to ensure their correct routing and handling. In accordance with those protocols, various communication devices such as switches, routers and hosts (e.g., computer systems) must appropriately process the communications at their source, destination and in between.

For example, a packet, frame, cell or other communication element received at a device from a network or other communication link is processed (e.g., by a protocol processor) to parse or remove a protocol header, retrieve a payload (i.e., data) or relevant protocol information, etc. Conversely, data to be transmitted by the device over the network or communication link must be supplemented with appropriate headers or other packaging.

Depending on the content of a particular protocol header, a packet may be handled in different manners (e.g., via a "fast path" or "slow path"). For example, a TCP (Transport Control Protocol) segment or packet received out of order in a receive flow, or with multiple options set, may be assigned to a slow path of processing, while a TCP segment received in order may be processed through a fast path. Communications handled via the slow path necessarily require more processing than fast path communications, but slow path processing offers the flexibility of handling evolving protocols.

Further, protocol processing typically involves the handling of both inbound (i.e., receive) and outbound (i.e., transmit) traffic. For example, a protocol processor configured for handling TCP communications with a remote entity will handle both inbound and outbound flows, and the status of one flow will affect how the other is processed. Thus, a TCP header to be placed on data in an outbound flow to a particular entity may need to reflect the status of a corresponding inbound flow from that entity (e.g., to acknowledge receipt of one or more TCP segments).

A control memory is typically updated in association with protocol processing operations. Illustratively, the control memory will retain protocol processing data needed to generate a header for an outbound flow. However, due to the speed of data communications, the unpredictable nature of data traffic, the need to store statuses of inbound and outbound flows, and the possibility of traffic being processed out of order, the control memory may be updated in an irregular manner.

As a result, the status information in the control memory needed for generation of a new protocol header is unlikely to be stored contiguously. Multiple accesses and read operations are therefore required to retrieve the necessary information. For example, in TCP protocol processing, several TCP data fields must be retrieved to generate a new protocol header. The more time needed to retrieve the protocol processing data, the longer it will take to generate the header and the lower the throughput of the transmit process. The back pressure or processing delay caused by the time spent generating a header will affect the protocol processor and, eventually, a host (e.g., a server).

SUMMARY

In one embodiment of the invention, a protocol processing cache is provided for caching protocol processing data. The protocol processing cache facilitates expeditious processing of data communications, including the generation of protocol headers. When a new header is to be generated for outbound traffic, data that is needed for header generation, but which is not provided with the request for a new header (i.e., from a protocol processor), can be retrieved much more rapidly from the cache (e.g., in one retrieval, from one cache entry) than from a control memory. In this embodiment, the required data are guaranteed to be in the cache at the time of header generation.

In an embodiment of the invention, specified data from an inbound (receive) flow are stored in the cache after being processed by a protocol processor. Similarly, specified data from an outbound flow are also cached, and some may bypass the protocol processor. In particular, some transmit flow data that are not needed by the protocol processor may be placed directly into the cache. Other transmit flow data may be stored in the cache after being processed by the protocol processor. When a new outbound header is to be generated, necessary data may be quickly retrieved (e.g., in one access).

In one implementation of a protocol processing cache, each entry in the cache is configured to contain much of the data needed for header generation, plus a tag identifying the communication connection to which the data pertains, or a control memory index of the connection. An entry may also include indicators as to whether the corresponding receive flow for the connection has acknowledged the connection, whether the corresponding receive flow has been detected, and whether a corresponding transmit flow contains up-to-date data from the receive flow. In addition, other indicators may be employed to identify valid entries in the cache and, where multiple entries are stored for one connection, identify which of them is the latest or most recent.

DETAILED DESCRIPTION

Figure 1:
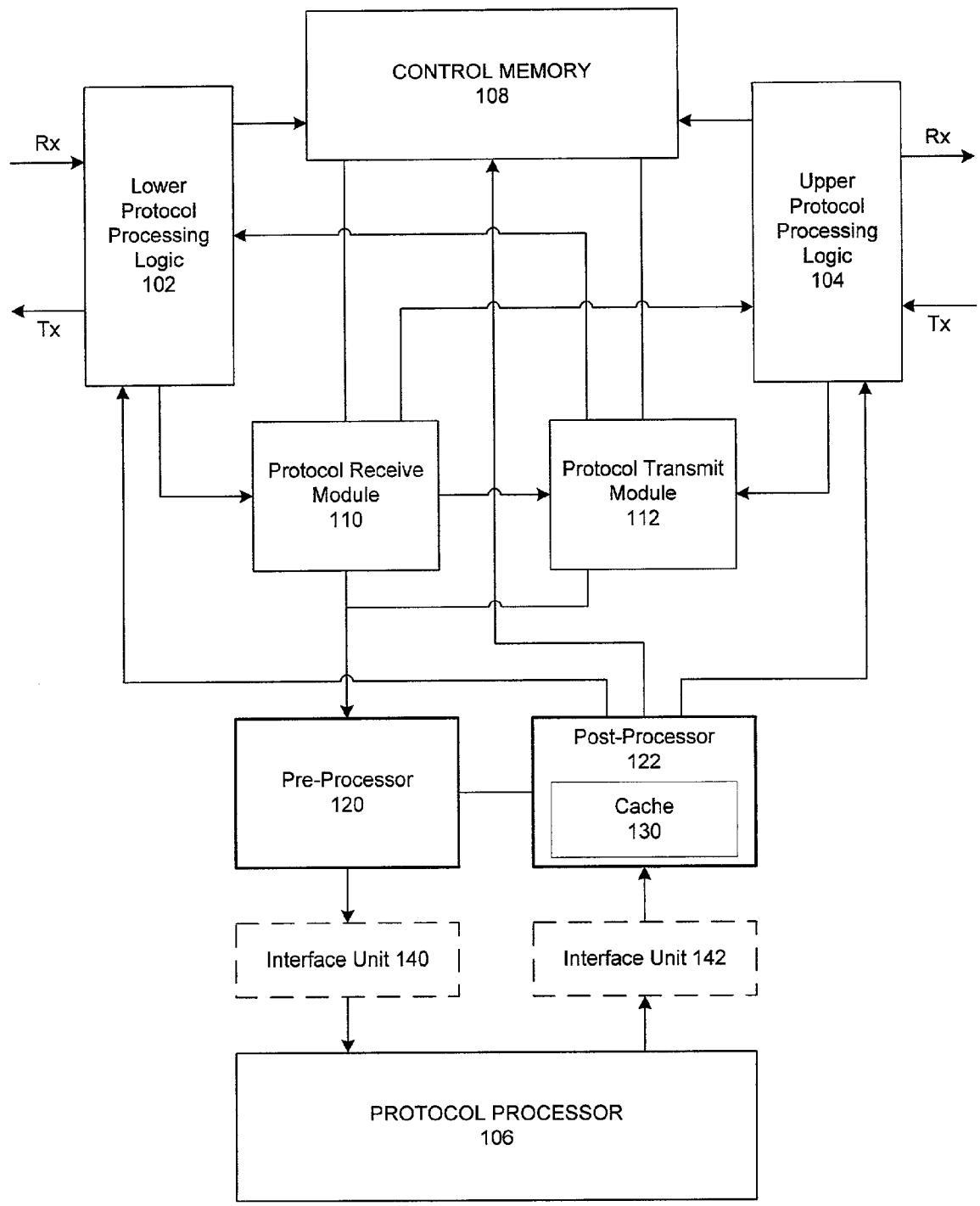
FIG. 1 is a block diagram of a system for performing protocol processing, according to an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a computer system (e.g., a communication, data or application server) or a special purpose device such as a communication processor, switch. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

In one embodiment of the invention, a cache local to a protocol processor stores data to facilitate protocol processing. The cache provides faster access to the data than is afforded by a conventional control memory. Illustratively, retrieval of control data from a conventional control memory typically required multiple accesses and reads. Reading from a conventional control memory may also be further delayed due to memory access arbitration among many requesters.

In contrast, retrieval of control data in this embodiment of the invention (e.g., for generation of a new protocol header) may be performed in a single cache access. In this embodiment, the cached data includes data drawn from either or both inbound (i.e., receive) and outbound (i.e., transmit) communication flows.

Embodiments of the invention configured to handle and process TCP (Transport Control Protocol) communication traffic are described herein. Embodiments suitable for implementation with other communication protocols may be derived from these descriptions.

In an embodiment of the invention designed for protocol processing of TCP traffic, data to be cached in a protocol processor cache may be classified as one of three types, as described below. Depending on its type, data may be routed and cached appropriately, and may not necessarily be handled by a protocol processor. For example, data needed for header generation (e.g., by a header generator), but not otherwise required by a protocol processor, may bypass the protocol processor and be placed directly in the cache. Other data, such as those data fields that must be updated by the protocol processor, are cached upon receipt from the protocol processor. Still other data, besides the three types mentioned above, may be passed directly to a header generator, from the protocol processor, when a new header is required (and therefore do not need to be cached).

The cache allows search, update and retrieval operations, and stores data regarding both transmit and receive TCP flows. In one implementation, the three types of data, all of which are needed when a new protocol header is to be generated, may be stored in a single cache entry, which is associated with a particular TCP connection.

The following definitions are provided for the purpose of describing one or more particular embodiments of the invention. "Fast path" refers to the relatively fast protocol processing path offered for communication segments that are in sequence and have, at most, only a minor option (e.g., timestamp). In contrast, "slow path" refers to the additional processing required for segments that cannot be handled via the fast path. Illustratively, a TCP segment may be assigned to the slow path because it is received out of order, has multiple or non-minor options specified (e.g., a selective acknowledgement), or contains other unresolved problems. Also, communications conforming to new or evolving protocols, and communications too complicated to handle in hardware (e.g., those involving a selective acknowledgement), are often assigned to the slow path.

More specifically, in one embodiment of the invention, inbound (receive) segments may be relegated to the slow path if received out of order, without an ACK (Acknowledge) bit set, outside an expected window, or if the previous segment was processed in the slow path. A receive segment may also traverse the slow path if an acknowledgement of the received segment is invalid (e.g., cannot be handled by a known protocol) or an old duplicate is detected.

Illustratively, an outbound (transmit) segment may be consigned to the slow path if fast retransmit and fast recovery are performed, a retransmit timer, a persist timer or a keep-alive timer fires, if SACK (Selective Acknowledgement) is active and an out-of-order packet is received, or if a transmit window shrinks.

The terms control data and protocol processing data may be used interchangeably. The following abbreviations may be used in a description of an embodiment of the invention:

toPPtx refers to data (e.g., control data used for protocol processing) being routed to a protocol processor for a transmit flow;

toPPrx refers to data being routed to the protocol processor for a receive flow;

frPPtx refers to data being routed from the protocol processor for a transmit flow; and frPPrx refers to data being routed from the protocol processor for a receive flow.

FIG. 1 depicts a protocol processing system comprising an embodiment of the invention. In the system of FIG. 1, inbound (i.e., receive) traffic is received through lower protocol processing logic 102, which may handle protocol processing for a particular protocol or protocol stack (e.g., to interface with an external communication network, device or system). Outbound (i.e., transmit) traffic is received through upper protocol processing logic 104, which may handle protocol processing for another protocol or protocol stack (e.g., to interface with an internal system or device).

After being processed by the system, inbound traffic is passed to upper protocol processing logic 104, while outbound traffic is passed to lower protocol processing logic 102. Illustratively, lower protocol processing logic 102 may provide a path to/from the Internet, while upper protocol processing logic 104 provides a path to a data center, server or internal communication architecture (e.g., an InfiniBand network).

More specifically, in one embodiment of the invention, lower protocol processing logic 102 processes packets involving a layer 3 (network) layer protocol (i.e., of the seven layer ISO-OSI standard), such as IP (Internet Protocol), and possibly part of a layer 4 (transport) protocol, such as UDP (User Datagram Protocol). In this embodiment, logic 102 forwards TCP packets to protocol receive module 110 of FIG. 1. Upper protocol processing logic 104 primarily processes InfiniBand packets or packets adhering to another suitable protocol for connecting elements in a data center, SAN (System Area Network) or other system. An embodiment of the invention may therefore be configured to transfer TCP communications to an InfiniBand network and transfer Infiniband communications to a TCP/IP network.

In the embodiment of the invention depicted in FIG. 1, the communication elements or units handled by a protocol processing system may be referred to as TCP segments, packets, frames, etc. In particular, for inbound traffic, the protocol processing system of FIG. 1 handles packets after they have been processed by or for lower-level protocols, and receives TCP segments and TCP control data. Also, the system forms TCP segments for outbound traffic, and passes them forward for lower-level protocol processing into transmittable packets.

Protocol processor 106, in the illustrated system, is a special purpose processor configured to perform various protocol processing operations. Control memory 108 may comprise a conventional control block memory, and is configured to store various control data and statuses concerning TCP communication flows handled by the system. In particular, the control memory may be part of a memory, external to the protocol processor, that includes payload memory and/or memory management tables (e.g., a payload pointer table). Control memory 108 may receive data from lower protocol processor logic 102 and upper protocol processing logic 104.

Protocol receive module (PrM) 110 receives inbound TCP traffic and makes an initial determination, for each TCP segment, as to whether it should be handled via slow path or fast path. Protocol transmit module (PtM) 112 receives outbound TCP traffic and makes a similar determination.

Both PrM 110 and PtM 112 exchange information with control memory 108. PrM 110 receives inbound traffic from lower protocol processing unit 102 and may pass data to PtM 112 and/or upper protocol processing logic 104 (e.g., during fast path processing). PtM 112 receives outbound traffic from upper protocol processing logic 104, and forwards it to lower protocol processing logic 102. PtM 112 may be triggered by PrM 110 to generate outbound traffic.

Data passed to upper protocol processing logic 104 (e.g., from PrM 110, PostP 122) may include a control block index (for accessing control block memory), a packet payload pointer, packet length and/or other control information. The control information may be used to notify a server of some status (e.g., out-of-order segments are all received) or trigger a server to take certain action (e.g., move data in received buffer immediately). Data passed to lower protocol processing logic 102 (e.g., from PtM 112, PostP 122) may include outbound packet payload pointers, transmit priorities, new TCP/IP headers, control information about the types of outbound packets, etc.

Pre-processor (PreP) 120 handles control data received from both PrM 110 and PtM 112, and forwards control data to protocol processor 106. Post-processor (PostP) 122 receives processed data from the protocol processor and may also interface directly with PreP 120. PostP 122 also sends data to control memory 108 (e.g., for storage), and forwards data to lower protocol processing unit 102 and upper protocol processing unit 104.

In the system of FIG. 1, post-processor 122 includes cache 130 for caching various control data or protocol processing data produced and/or used during protocol processing operations. In particular, cache 130 stores control data that will be needed when a new header is to be generated for outbound traffic, to expedite header generation.

In an embodiment of the invention, for an inbound flow PreP 120 receives TCP vectors, flags, header pointers, control data from control memory 108 and indexes within the control memory. For an outbound flow, PreP 120 receives TCP vectors, hardware clock information, control data from control memory 108 and indexes within the control memory.

Also, PreP 120 may request TCP header data from a Buffer Memory Manager (BMM), arbitrate protocol processing data queued for the protocol processor, perform data framing (e.g., add framing data to protocol processing data), help track the number of outstanding transactions in the protocol processor, and perform other functions.

PostP 122 receives data processed by the protocol processor, validates transactions received from the processor, distributes protocol processing data, and performs exception handling and other tasks.

In one embodiment of the invention, for inbound flows PostP 122 updates the control memory, passes protocol data forward for higher level protocol processing, and searches and updates cache 130. For outbound flows, the post-processor updates the control memory, reads a header template from the control memory to facilitate generation of a new TCP header, searches cache 130, performs packet payload segmentation if its length is larger than the maximum segment size or a size that is acceptable to a client, requests and forwards header pointers, etc.

Illustratively, the payload of a packet—received by lower protocol processing logic 102 or upper protocol processing logic 104—is stored in a packet payload memory (e.g., part of external memory that includes control memory 108). The packet's TCP/IP headers, packet pointers, control block data, etc., are passed to PrM 110 or PtM 112. A packet pointer will be used to retrieve the payload after the packet control data has been processed.

Various interfaces or other intervening modules may be implemented between protocol processor 106 and pre- and post-processors 120, 122, and between other modules depicted in FIG. 1. For example, interface units 140, 142 may comprise appropriate bus interface units and/or communication modules (e.g., Unified Port Architecture—UPA—transmit and receive modules) to allow PreP 120 and PostP 122 to be processor independent.

Thus, FIG. 1 is not intended to include every element of a protocol processing system. The system depicted in FIG. 1 is meant to reflect only one possible protocol processing system or environment in which an embodiment of the invention may be implemented.

In the protocol processing system of FIG. 1, data from TCP traffic handled via fast path may not be processed by protocol processor 106. Illustratively, fast path TCP traffic in a receive flow may be received by PrM 110 from lower level protocol processing logic 102, and passed to PtM 112 and/or upper protocol processing logic 104. For example, PrM 110 may communicate directly with PtM 112 when an immediate response is required to a receive client (e.g., because of a non-delayed acknowledgement, a fast retransmit, timeout, duplicate acknowledgement, connection teardown request from client). Conversely, transmit flow traffic handled in a fast path may be received at PtM 112 from upper protocol processing logic 104 and forwarded directly to lower protocol processing logic 102.

However, during the processing of fast path traffic, control memory 108 may be updated accordingly. Control data needed for processing fast path or slow path traffic may be retrieved from the control memory by pre-processor 120. In the embodiment of the invention depicted in FIG. 1, most of the data PreP 120 requires are passed from PrM 110, except those TCP header options that the fast path cannot handle. PreP 120 may access control memory directly for those TCP header options. When a portion of a particular TCP connection is processed in slow path, subsequent TCP segments in that connection will be forwarded directly to slow path. In this case, the control data that PrM 110 read from control block memory 108 may be out-of-date because the processed data from the protocol processor did not finish before the next TCP segment arrived. In this embodiment, this is not a problem because protocol processor 106 and cache 130 have copies of the latest data for protocol processing and for constructing the TCP/IP header. Cache 130 will keep updating its entries with the most up-to-date control data, or carry them until they are pushed out of the queue. They may re-enter when needed.

In the embodiment of the invention depicted in FIG. 1, fast path communications are processed by PrM 110 and/or PtM 112. Slow path communications are handled by PreP 120 and PostP 122. Thus, fast path processing sends inbound (i.e., receive) packets and outbound (i.e., transmit) packets to different modules, while slow path processing sends both inbound and outbound packets through the same modules for processing through a single protocol processor. However, in an alternative embodiment of the invention, fast path and slow path logic may be merged. Thus, viewed from a high level, fast path and slow path may be treated as one for the purpose of processing TCP layer protocols. In this case, a protocol processing cache (e.g., cache 130) may be located at the output side of a protocol processor interface.

Figure 2:
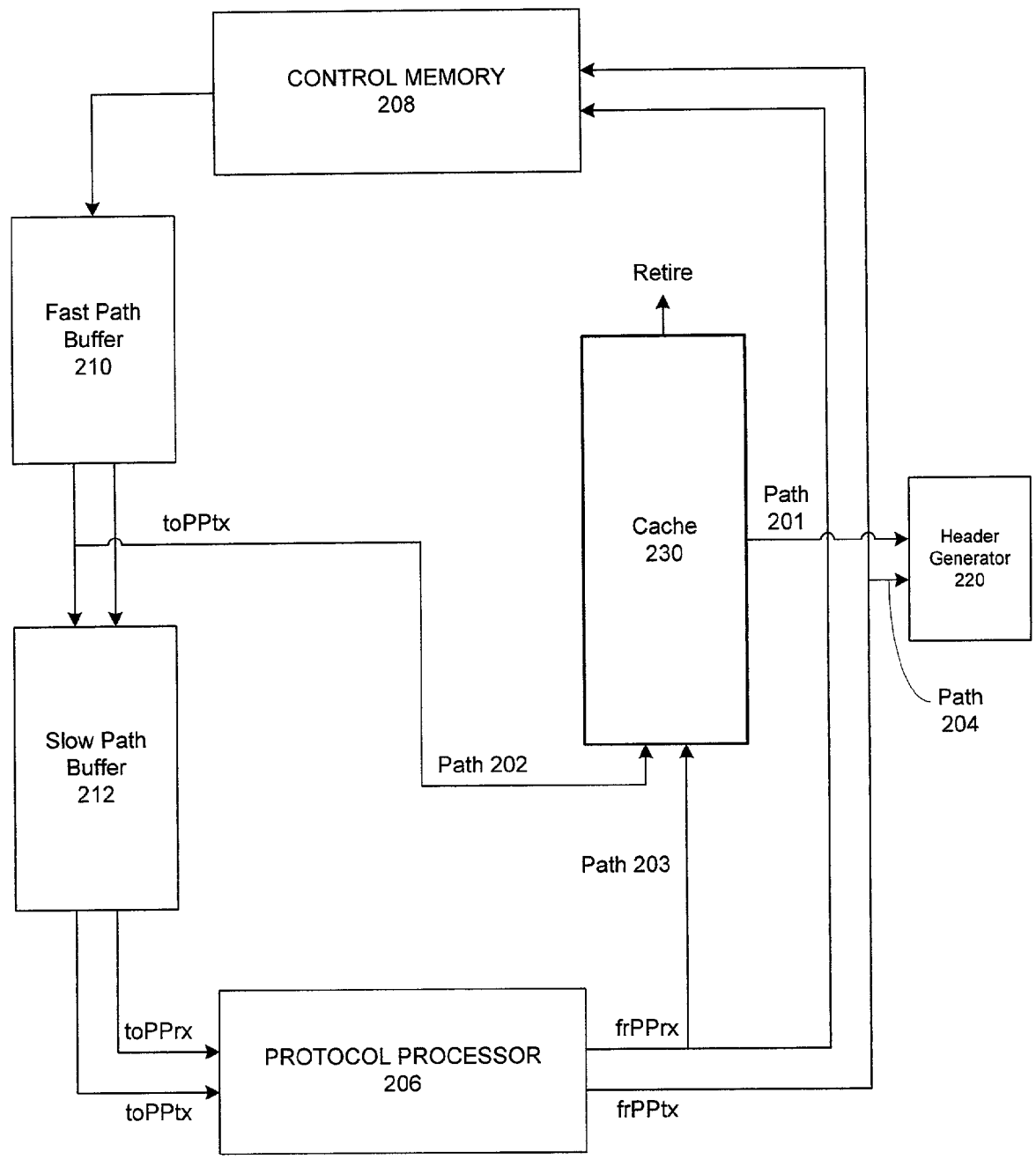
FIG. 2 demonstrates a data flow during protocol processing, in accordance with an embodiment of the invention.

FIG. 2 depicts the flow of protocol processing data or control data, for TCP traffic, during the operation of a protocol processing system such as the system of FIG. 1, according to one embodiment of the invention. In this embodiment, protocol processor 206 and control memory 208 correspond to protocol processor 106 and control memory 108, respectively, of the system of FIG. 1.

Illustratively, fast path buffer 210 is part of a protocol receive module (e.g., such as PrM 110 of FIG. 1), while slow path buffer 212 is implemented within a protocol pre-processing module (e.g., such as PreP 120 of FIG. 1).

Cache 230 resides within a protocol post-processing module (e.g., such as PostP 122 of FIG. 1), while header generator 220 may comprise another module of a protocol processing system, or may be implemented as an ASIC (Application Specific Integrated Circuit) or some other element configured to generate a protocol header for an outbound TCP segment.

In the illustrated embodiment of the invention, cache 230 is configured to store control data needed for the generation of a new header. Instead of the relatively lengthy period of time necessary to make multiple accesses to control memory 208 to read such data, the data can be rapidly retrieved from the cache. However, control memory 208 is still updated with at least some of the data produced by protocol processor 206.

Protocol processor 206 processes data in the order of receipt of their TCP segments. However, the segments may be received out of order, and further, inbound and outbound flows may be interweaved. As a result, the data needed for generation of a new header will likely be received in disjointed fashion. An entry in cache 230 may therefore be configured to store all three types of data (discussed below) so that a single retrieve operation can provide header generator 220 with all three types at once.

Slow path data corresponding to inbound (or receive) traffic are received at slow path buffer 212 from fast path buffer 210. The slow path buffer provides the data to protocol processor 206 as toPPrx. After being used by the protocol processor, the data exits as frPPrx, some of which may be used to update control memory 208 and some, depending on the type of data, may be stored in cache 230.

Slow path data for outbound (or transmit) traffic is also forwarded from fast path buffer 210, as toPPtx. If of an appropriate type, the data may bypass the protocol processor to reach the cache (e.g., via path 202). Other data may pass through the slow path buffer to the protocol processor; yet other data may be forwarded toward the protocol processor and also be passed to the cache via path 202. From protocol processor 206, outbound flow data may be characterized as frPPtx and may be used to update the control memory and/or cache 230. Also, some frPPtx data may pass directly to header generator 220 when it is time to generate a new header.

Path 201 identifies the path by which a cache entry is retrieved for a TCP connection, by header generator 220, when the protocol processor orders the creation of a new segment or packet for the transmit flow of the connection. Path 202 indicates the path by which toPPtx data may access the cache. When toPPtx data arrives via path 202, the cache is searched for an entry associated with the operative TCP connection. The entry is updated, replaced or merged with the arriving data. Similarly, search and update procedures are performed for frPPrx data arriving at the cache via path 203. Path 204 represents the path taken by frPPtx data passed directly to the header generator by the protocol processor (i.e., without being cached).

As described above, in one embodiment of the invention, cache 230 stores three types of data. A first type (termed "Type I") comprises data that, generally, remains unchanged during a TCP connection, but which may need to be read (e.g., by a pre-processor), and is therefore used in a read-only manner. Type I data may be received at, or used by, a protocol processor during both receive flows (as toPPrx) and/or transmit flows (as toPPtx) but, in this embodiment of the invention, Type I data are only cached during transmit flows. Illustratively, cacheable Type I data may include such TCP fields as rcv_wnd_scale (receive window scaling factor) and max_seg_size (maximum segment size).

Type II data are read-only in a transmit flow (toPPtx), but read/write in a receive flow (frPPrx). The protocol processor may resolve any coherency issues that arise between receive and transmit flows. Type II data in both transmit and receive flows are subject to caching. However, transmit flow Type II data (toPPtx) may only be cached (e.g., via path 202 of FIG. 2) when no corresponding receive flow Type II data (frPPrx) are already cached. In one embodiment of the invention, Type II data that are subject to caching may include TCP fields such as recv_next (the next TCP sequence number expected in a receive flow), send_unacked (the last sequence number sent, but not acknowledged, in a transmit flow) and ts_recent (received timestamp).

Type III data comprises data required by the header generator, but not the protocol processor. Type III data, in a present embodiment of the invention, exists only in transmit flows (i.e., not in receive flows). Type III data issue from a fast path buffer as toPPtx, and bypass the protocol processor (e.g., via path 202 in the embodiment of FIG. 2), before being cached. Cached Type III data may be updated based on frPPrx output from the protocol processor (e.g., when an acknowledged packet is received). Illustratively, cached Type III data may include the fields tcp_st_index (the starting index, in a memory buffer, of the transmit TCP payload) and tcp_st_offset (the address offset, from the starting index, of the transmit TCP payload).

Other data needed when a new header is to be generated may be provided directly to the header generator by the protocol processor, and therefore need not be cached. Illustratively, these data (termed "Type 0") may include fields such as $snd_{13}$ urg_pntr (the urgent pointer, to be inserted in an outbound packet), prev_recv_wnd (the previous receive window from an inbound packet), tx_seq_no (the sequence number to be inserted in an outbound packet) and snd_ts (the send timestamp to be inserted in an outbound packet). One or more of these fields may be received and possibly altered by the protocol processor, but are then passed directly to the header generator when a new header is needed. In an alternative embodiment of the invention, however, any of these fields may be cached. In other alternative embodiments of the invention, any combination of fields or variables may be cached—including, but not limited to, those described here.

TABLE 1 summarizes the flow of data through a protocol processing system or apparatus, for one embodiment of the invention.

TABLE 1

| Data Type | TCP Flow | Input to PP? | Output from PP? | Cached? | Description |
|---|---|---|---|---|---|
| Type 0 | Rx | No | No | No | Not used |
|  | Tx | Yes | Yes | No | Pass directly to header generator from PP |
| Type I | Rx | Yes | No | No | Pass to PP, not cached |
|  | Tx | Yes | No | Yes (toPPtx) | Pass to PP and cache |
| Type II | Rx | Yes | Yes | Yes (frPPrx) | Pass to PP and cache |
|  | Tx | Yes | No | Yes (toPPtx) | Pass to PP and cache |
| Type III | Rx | — | — | — | Does not exist |
|  | Tx | No | No | Yes (toPPtx) | Bypasses PP |

Figure 3:
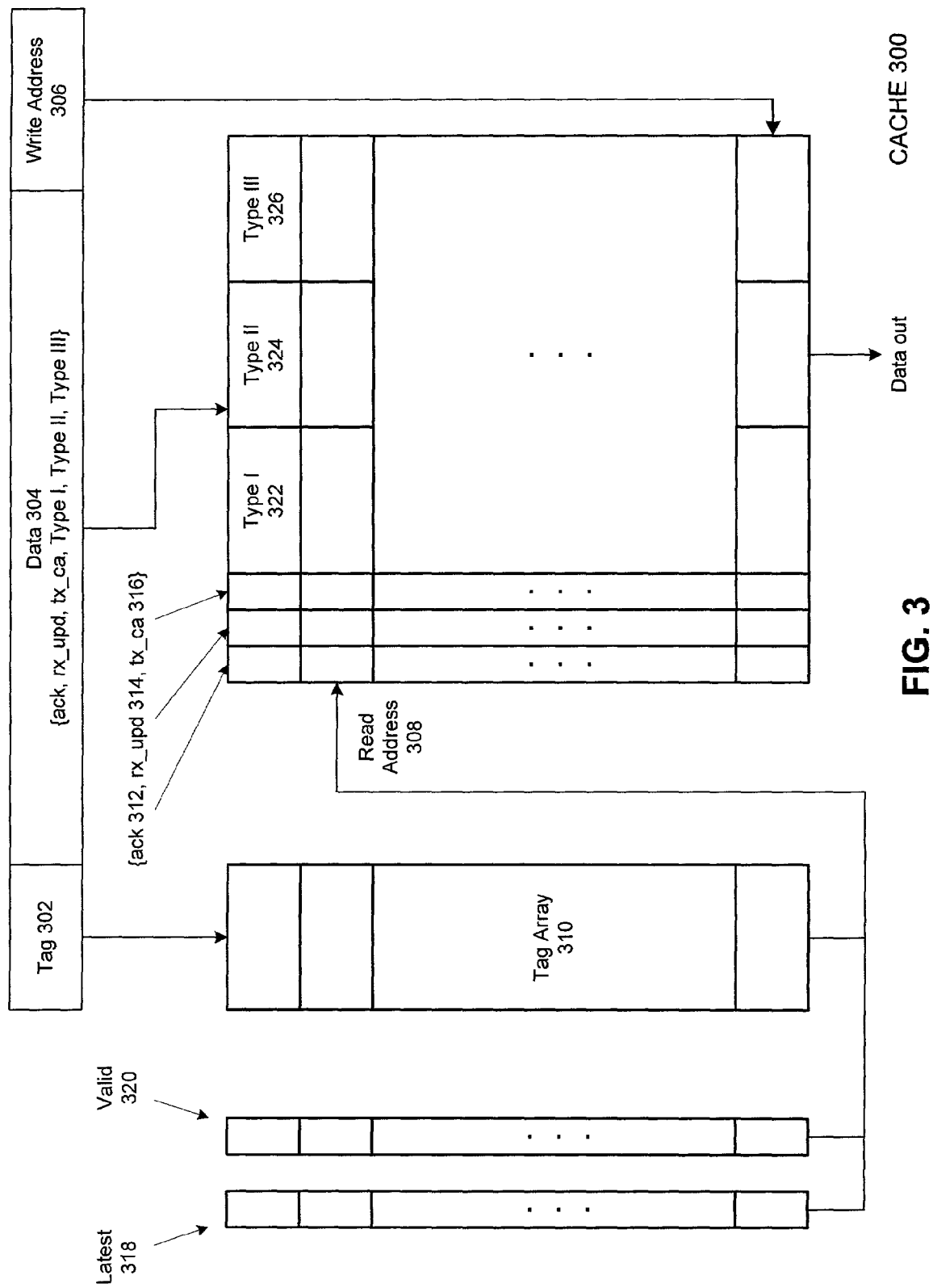
FIG. 3 is a cache for storing protocol processing data, in accordance with an embodiment of the present invention.

FIG. 3 is an illustrative configuration of a protocol processing cache, such as cache 230 of FIG. 2, according to one embodiment of the invention. Each entry in cache 300 of FIG. 3 is configured to store the three types of data described above (i.e., Types I, II and III), means for identifying the TCP connection the data corresponds to, and control bits and indicators for facilitating operation of the cache. Search and update operations can be performed within the cache, back to back, in just two clock cycles (if no arbitration is required).

Input to cache 300 may be received as a combination of tag 302, data 304 and write address 306. Tag 302 comprises a TCP connection identifier or an index (or key) into a control memory (e.g., control memory 108 of FIG. 1), of the TCP connection to which the data pertains. The tag therefore directly identifies a communication connection or enables the ready identification of the connection.

Data 304 may include any or all of ack (acknowledgement) 312, rx_upd (receive update) 314, tx_ca (transmit carry) 316 and data of Types I, II and/or III. Write address 306 identifies an address or entry of cache 300 that may be written to. Similarly, read address 308 identifies an entry that matches search parameters.

Tag 302 is extracted and stored in tag array 310 of cache 300, which can be quickly searched for entries corresponding to a particular TCP connection. The tag array, and the cache, may be written in a FIFO fashion, whereby the write address is incremented in a circular fashion, but is read by memory index. Tag array 310 allows searches, and, along with latest indicator 318 and valid indicator 320 (described below) facilitates generation of a read address (e.g., read address 308) to locate and read a requested cache entry.

In the illustrated embodiment of the invention, instead of spending time to search the cache for a previous entry and then replacing that entry with newly received data, the receipt of data at cache 300 will always result in the creation of a new cache entry. The contents with which a new entry is populated may depend on whether a previous entry exists for the same connection, the status of the ack, rx_upd and tx_ca indicators, etc.

More particularly, for a new cache entry arriving via path 202 or path 203 (shown in FIG. 2), a new tag is stored in tag array 310 and the tag array is searched for another tag corresponding to the same TCP connection. If another tag is found, the Type I, II and III data associated with the other tag may be used to update the data associated with the new entry. For example, depending on the values of ack 312, rx_upd 314 and tx_ca 316 of the other entry, the new entry may be populated with some or all of the data from the other entry.

If no other tag in the tag array corresponds to the same TCP connection as the new tag, then the data in the new cache entry are stored as received.

In this embodiment of the cache, each of ack 312, rx_upd 314 and tx_ca 316 is a one-bit indicator. Ack 312, if set, indicates that an acknowledgement of a transmitted TCP segment was received from the other flow participant. In an embodiment in which cache 300 and the protocol processing system are implemented at a host or server site, the other participant may be a client computer system or computing device.

Rx_upd 314 indicates whether the receive flow for the present connection has been active. If set, rx_upd 314 indicates that the corresponding cache entry has been updated with Type II data from the receive flow. For example, upon receipt of frPPrx data containing an acknowledgement, ack 312 and rx_upd 314 may be set from 0 to 1. When the next toPPtx data for the connection are processed, the ack and rx_upd values may be reset to 0.

Tx_ca 316, if set, indicates that the transmit flow for the present TCP connection includes up-to-date receive flow data. Use of tx_ca 316 helps prevent up-to-date receive flow data from being overwritten (e.g., by Type II or Type III toPPtx data that bypasses the protocol processor).

More particularly, the tx_ca control bit is necessitated because, in the presently described embodiment of the invention, the fast path and slow path buffers are separate entities. Because the toPPtx search and update operations (e.g., via path 202 in FIG. 2) are only conducted for slow path segments, control data read from the control memory (e.g., control memory 208 in FIG. 2) are not immediately reflected in cache 300. It may happen that, before control data are passed from fast path to slow path, intervening receive flow data may be written to the cache (e.g., as frPPrx data via path 203 in FIG. 2). In this case, the data coming from fast path to slow path are out-of-date and we want to carry the frPPrx data. The most up-to-date Type II data will be those received as frPPrx.

A combination of the three control bits ack, rx_upd and tx_ca, for a particular cache entry, may be represented herein by a tuple in the form {ack, rx_upd, tx_ca}.

In an embodiment of the invention, the values of ack 312, rx_upd 314 and tx_ca 316 may be affected in various ways during search and update operations on cache 300. In the embodiment of the invention depicted in FIG. 3, the manner in which these control bits are modified depends upon whether the cache operation relates toPPtx data (e.g., Types I, II and III) or frPPrx data (Type II). For toPPtx data, it also depends on whether the search results in a hit or a miss in the cache and, for frPPrx data, whether the receive flow includes an acknowledgement.

Thus, when toPPtx data are received at cache 300 and a search for any previous entries for the same connection results in a miss, then a new cache entry is created and populated with the toPPtx data.

When toPPtx data are received and the cache search results in a hit, only certain permutations of control bit values may be significant, or even possible. For example, if ack 312 is set in a particular entry of the cache, then rx_upd 314 should also be set in the same entry. Illustratively, the permutations of interest in the embodiment of FIG. 3 include {0, 0, 0}, {0, 1, 0}, {1, 1, 0} and {0, 0, 1}. When a cache executes a search (e.g., upon receipt of a new entry), and locates a previous entry having one of these forms, a new entry is created and stored with the following control bit values:

|  | Old Entry |  | New Entry |
| --- | --- | --- | --- |
| (a) | {0, 0, 0} | → | {0, 0, 0} |
| (b) | {0, 1, 0} | → | {0, 0, 1} |
| (c) | {1, 1, 0} | → | {0, 0, 1} |
| (d) | {0, 0, 1} | → | {0, 0, 1} |

In case (a), all three Types of data are updated to reflect the toPPtx data. In other words, the data in the old entry are read and used to generate new data, which are stored in the new entry.

In cases (b)–(d), the new entry is configured to indicate that the transmit flow has the up-to-date receive flow data. In case (b), the Type II data of the old entry are carried forward and stored in the new entry, but the Type I and Type III data of the old entry are updated. For case (c), only Type I data are updated; Types II and III are carried forward from the old entry. For case (d), all three Types of data are carried forward.

When cache 300 receives frPPrx data, if the receive flow carried an acknowledgement, then regardless of whether the cache search results in a hit or a miss, and regardless of the values of the control bits of any previous entry, a new (or updated) entry is stored with its control bits set as {1, 1, 0}. The data contents of the new entry, however, depend upon whether the cache search resulted in a hit or a miss. If it was a hit, then Type I data are carried forward; Type II and Type III data are updated from the old entry. If the search resulted in a miss, then the frPPrx data may be stored as received at the cache.

If the receive flow does not contain an acknowledgement, then a new cache entry is created with control bit values {0, 1, 0}, regardless of the configuration of control bits for any previous entry for the connection, and regardless of whether a cache search yields a hit or a miss. As for the data to be stored in the new entry, if the cache search yielded a hit, then only Type II data will be updated from the previous entry; Types I and III will be carried forward. If the cache search yielded a miss, then the received frPPrx data may be stored as received at the cache.

TABLE 2 summarizes the manner in which a new cache entry may be populated with control bits ({ack, rx_upd, tx_ca}) and cached data ({Type I, Type II, Type III}) for a transmit flow, according to one embodiment of the invention. A "hit" indicates that a previous cache entry for a connection was found during a search; a "miss" indicates that no previous cache entry was found. An "update" operation indicates that data from a previous cache entry (i.e., the "hit" entry) are updated (e.g., a read-modify-write is performed on the previous entry). A "carry" operation indicates that the previous data are carried forward and stored in the new entry. An "overwrite" operation indicates that the new entry is populated with the data received at the cache (i.e., the new entry's data are not affected by the contents of any other cache entry).

TABLE 2

| Cache Search | Old Control Bits | New Control Bits | Data Operations {Type I, Type II, Type III} |
| --- | --- | --- | --- |
| Hit | {0, 0, 0} | {0, 0, 0} | {update, update, update} |
|  | {0, 1, 0} | {0, 0, 1} | {update, carry, update} |
|  | {1, 1, 0} | {0, 0, 1} | {update, carry, carry} |
|  | {0, 0, 1} | {0, 0, 1} | {carry, carry, carry} |
| Miss | {x, x, x} | {0, 0, 0} | {overwrite, overwrite, overwrite} |

TABLE 3 summarizes the manner in which a new cache entry may be populated with control bits ({ack, rx_upd, tx_ca}) and cached data ({Type I, Type II, Type III}) for a receive flow, according to one embodiment of the invention. An acknowledgment status of "ACK" indicates that a received communication (e.g., TCP segment) contained an acknowledgement for a transmitted communication. A status of "non-ACK" indicates that no acknowledgement was received. A "default" operation indicates that a default value (e.g., 0) may be stored.

TABLE 3

| ACK status | Cache Search | Old Control Bits | New Control Bits | Data Operations {Type I, Type II, Type III} |
| --- | --- | --- | --- | --- |
| ACK | Hit | {x, x, x} | {1, 1, 0} | {carry, update, update} |
|  | Miss | {x, x, x} | {1, 1, 0} | {default, overwrite, overwrite} |
| Non-ACK | Hit | {x, x, x} | {0, 1, 0} | {carry, update, carry} |
|  | Miss | {x, x, x} | {0, 1, 0} | {default, overwrite, default} |

Regarding the data operations reported in TABLE 3, it may be noted that, in a present embodiment of the invention, Type III data may be read from different sources when the acknowledgement status is "ACK." Illustratively, if the cache search results in a "hit," earlier Type III data are read from the previous cache entry, then new Type III data are calculated and used to update both the cache and a payload pointer table (used to manage payloads). If the cache search results in a "miss," then Type III data are read from the payload pointer table, and new Type III data are calculated and used to update both the cache and the payload pointer table.

To further illustrate this, one may consider an implementation of this embodiment in which Type III data are initialized by a server that communicates with an external network through the protocol processing system depicted in FIG. 1. The Type III data are checked by protocol processing logic (e.g., upper protocol processing logic 104) to determine if storage space is available for a packet payload in a particular connection. When an acknowledgement is detected (e.g., by post-processor 122 of FIG. 1), cached Type III data are updated appropriately. The new Type III data are generated on the basis of the previous Type III data for the connection, as well as newly received data (e.g., Type II data). The updated Type III data may indicate (e.g., to upper protocol processing logic 104) that some memory space has been made available.

Returning now to FIG. 3, latest indicator 318 identifies the most current entry in cache 300 for a given TCP connection (identified by tag 302). In this embodiment, cache 300 may include multiple entries for one connection. Each time a more up-to-date entry is stored, latest indicator 318 is set for the new entry, while latest indicator 318 for a previous entry for the same connection is cleared.

Valid indicator 320, when set for an entry in cache 300, indicates that that entry is valid. When cache 300 is initialized, all entries are empty—including their valid indicators. As entries are stored, their valid indicators are set accordingly. Illustratively, valid indicator 320 is of most importance from the time cache 300 is initialized until every entry is populated. From that point on, all entries may be valid, and latest indicator 318 may then be used to locate a most recent, valid, entry.

The size of cache 300 may depend upon the number of packets or TCP segments that may be active within the protocol processing system or apparatus at one time. Illustratively, the maximum number of outstanding transactions (i.e., packets or segments) the protocol processor may have at one time may be represented as PP_depth (e.g., representing the processor's pipeline depth). In one embodiment of the invention, PP_depth may be controllable by a pre-processor module (e.g., PreP 120 of FIG. 1).

The number of TCP segments in a fast path buffer may be represented as FP_depth, while the number of TCP segments in a slow path buffer may be identified as SP_depth. In one embodiment of the invention, therefore, cache 300 may be configured with a total number of entries equal, or approximately equal, to PP_depth+SP_depth.

PP_depth may be relatively small (e.g., 32, 64), and FP_depth may be kept just large enough to facilitate the fast path vs. slow path determination. SP_depth may depend upon the difference in throughput of the protocol processor and other protocol processing logic (e.g., protocol processing logic 102 and/or 104). The more powerful the protocol processor, the smaller SP_depth can be. One implementation of cache 300 is configured with a total of 64 or 128 entries.

The size of each entry in cache 300 depends upon the data fields included in each Type of data (see above) and their sizes, plus the size of tag 302 and the control bits and indicators.

In the illustrated embodiment of the invention, cache 300 stores only a portion of the data processed for a communication flow and only a portion of the data stored in the control memory (e.g., control memory 208 of FIG. 2). Therefore, a cache write-through scheme may be used to update the control memory, to ensure that fast path processing uses the most up-to-date receive flow data. In an alternative embodiment of the invention, in which all processed receive flow data may be cached, a write-back scheme to the control memory may be employed to save additional memory write bandwidth. In this alternative embodiment, the write-back would occur at the Nth entry of the cache, where N=(PP_depth+SP_depth).

Because of the unpredictable manner in which receive and transmit flow data may be received at a protocol processor or cache, arbitration may be required between concurrent attempts to access the cache. For example, in the embodiment of the invention depicted in FIG. 2, a toPPtx access (e.g., for search and update) may be attempted simultaneously with an frPPrx access (e.g., another search and update). To help ensure that receive flow data is always carried in the cache, the toPPtx update will be granted higher priority so that it will be performed before the competing frPPrx update. Similarly, a toPPtx update will have priority over a competing frPPrx read. In this embodiment, conflict between frPPrx data (e.g., path 203) and frPPtx data (e.g., path 201) will not occur, because the protocol processor can only return one flow at a time.

Figure 4:
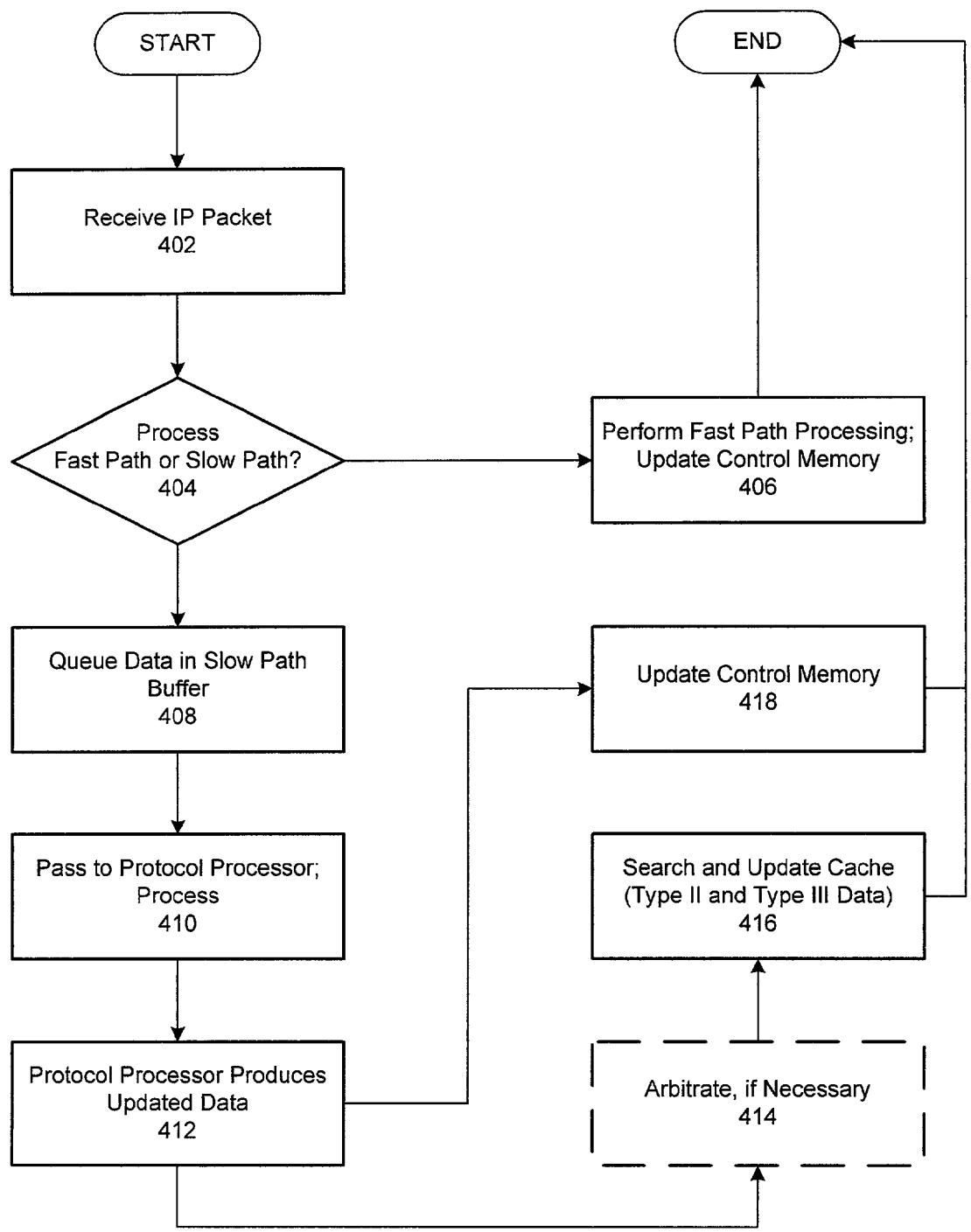
FIG. 4 is a flowchart illustrating one method of processing receive flow data, in accordance with an embodiment of the present invention.

FIG. 4 demonstrates a method of processing receive flow data according to one embodiment of the invention.

In the method of FIG. 4, an inbound IP packet or TCP segment is received in state 402. In state 404 a determination is made as to whether the packet may or should be processed in a fast path, or sent to the slow path. As described above, this decision may depend upon the format of the IP packet, whether it was received in order, options that are specified, etc. If the fast path is selected, the method proceeds to state 406. Otherwise, the illustrated procedure continues at state 408.

In state 406, a protocol receive module (e.g., PrM 110 of FIG. 1) or other fast path component processes the segment's control data. Updated data are written to a control memory and may be sent to another logic module (e.g., upper protocol processing logic 104 of FIG. 1). Fast path processing in this embodiment does not involve a protocol processing cache. After state 406, the illustrated procedure ends.

In state 408, control data necessary for processing the segment are read from a control memory, and the receive flow data are queued in a slow path buffer. In state 410 the data are passed to the protocol processor and processed (e.g., updated).

In state 412, the protocol processor outputs the receive flow data. In state 414, arbitration is performed, if necessary to gain access to the cache. In state 416, search and update operations are performed on the cache to store updated Type II and Type III data, as necessary.

Also, in state 418, the receive flow data are passed to the control memory. The method of FIG. 4 then ends.

Figure 5:
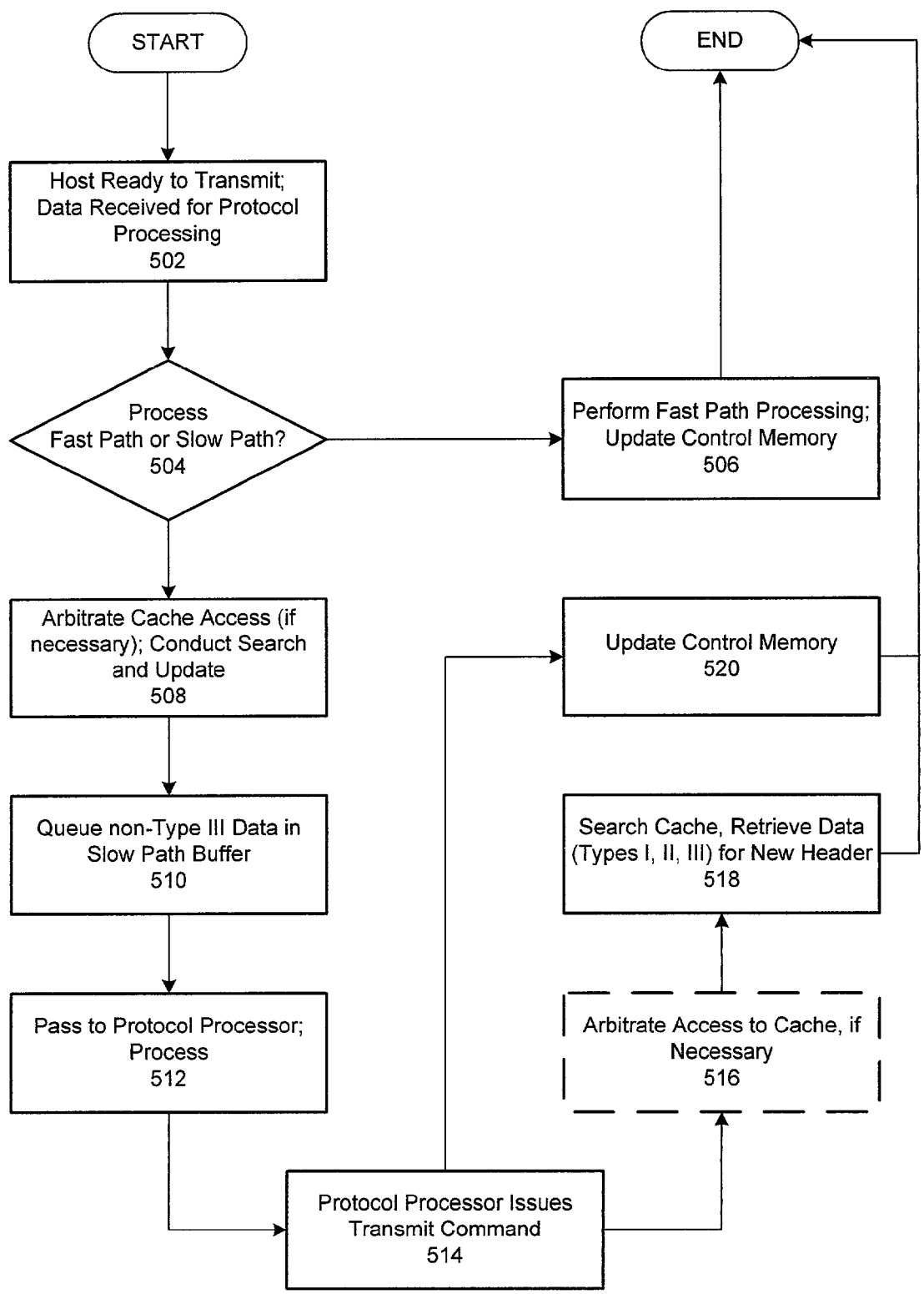
FIG. 5 is a flowchart illustrating one method of processing transmit flow data, in accordance with an embodiment of the invention.

FIG. 5 demonstrates a method of processing transmit flow data according to one embodiment of the invention.

In state 502, a host computer is prepared to transmit (e.g., a TCP segment) to a remote entity (e.g., a client). Data regarding the transmit flow are retrieved from a control memory.

In state 504 a determination is made as to whether the outgoing traffic may or should be processed via fast path or slow path. If fast path is selected, the procedure proceeds to state 506. If slow path is required, the illustrated method continues at state 508.

In state 506, a protocol transmit module (e.g., PtM 112 of FIG. 1) or other fast path component processes the segment's control data. Updated data are written to a control memory and may be sent to another logic module (e.g., lower protocol processing logic 102 of FIG. 1). Fast path processing in this embodiment does not involve a protocol processing cache. After state 506, the illustrated procedure ends.

In state 508, control data necessary for processing the segment are read from a control memory, and passed to a pre-processor (e.g., PreP 120 of FIG. 1). Data of Types I, II and III are passed to a protocol processing cache; arbitration may be required if an attempted search and update operation coincides with another cache access. Types I and II will also go to the protocol processor, Type III will not.

In state 510, the transmit flow data (other than Type III) are queued in a slow path buffer. In state 512, the non-Type III data are passed to the protocol processor and processed (e.g., updated, used to determine if a new header is required).

In state 514 the protocol processor issues a transmit command and outputs the transmit flow data. Type 0 data may be passed directly to a header generator.

In state 516, arbitration may be performed to gain access to the cache to retrieve data needed to generate a new header. In state 518, the necessary data (Types I, II and III) are retrieved from the cache.

In state 520, the control memory is updated with the transmit flow data, as necessary. Afterwards, the illustrated procedure ends.

Figure 6:
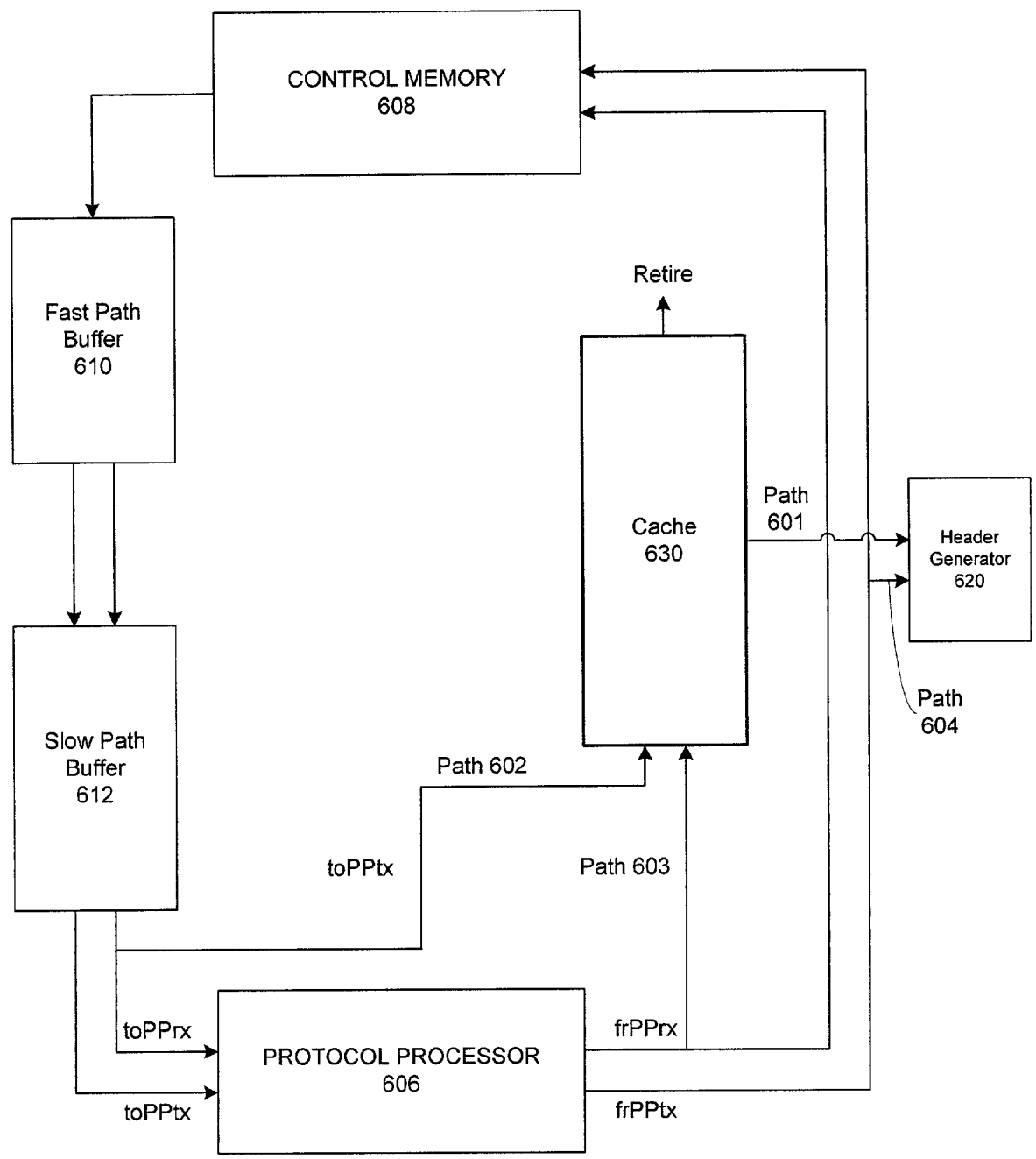
FIG. 6 demonstrates a data flow during protocol processing, in accordance with one alternative embodiment of the invention.

FIG. 6 depicts a write-through scheme for protocol processing data, in accordance with one alternative embodiment of the invention. FIG. 2 demonstrated another write-through method of caching. In the embodiment of FIG. 6, path 602 (for toPPtx) leads to cache 630 from slow path buffer 612 rather than fast path buffer 610. As a result, the size of cache 630 can be decreased from (PP_depth+SP_depth) to just PP_depth.

Figure 7:
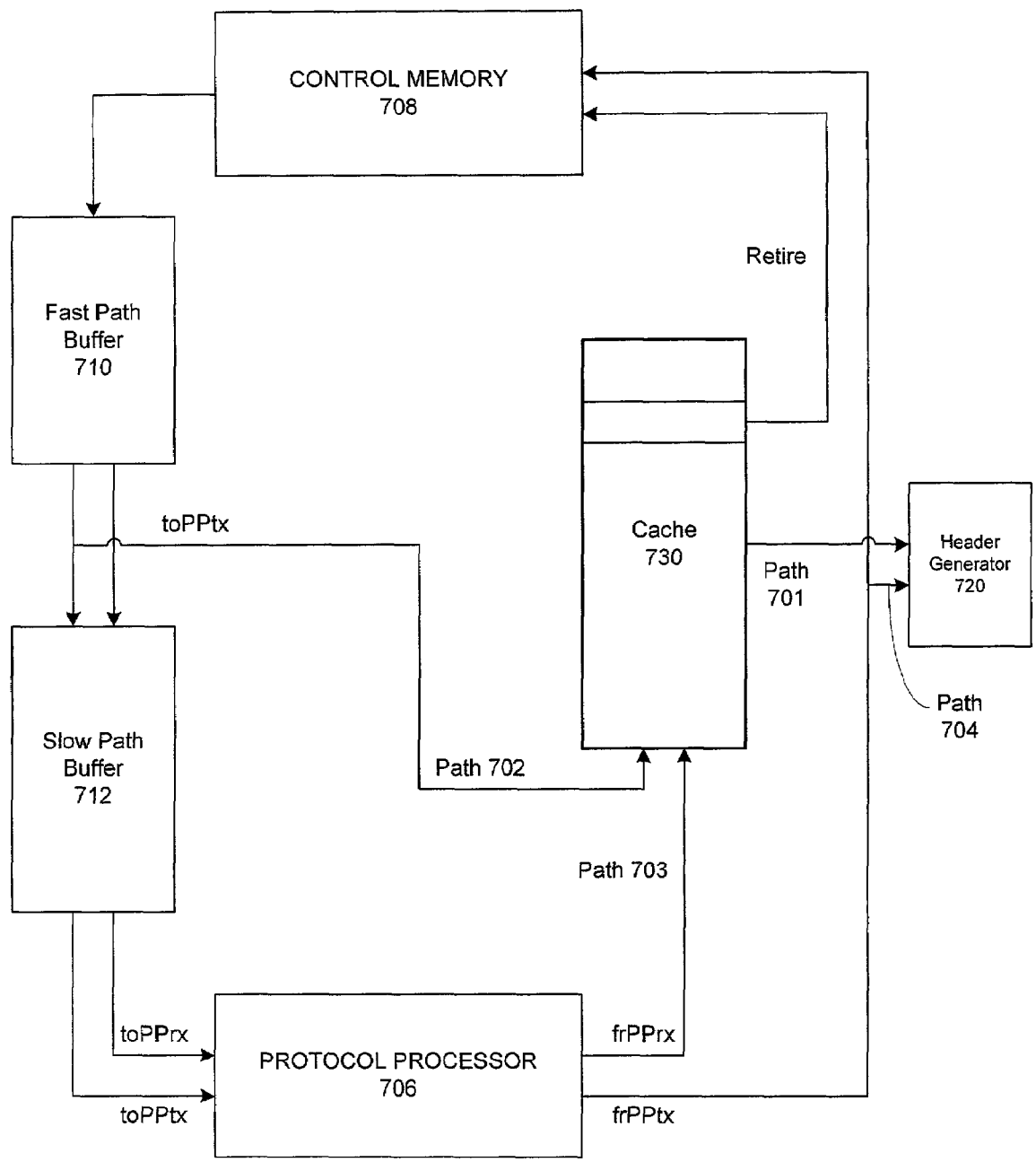
FIG. 7 demonstrates a data flow during protocol processing, in accordance with another alternative embodiment of the invention.

FIG. 7 depicts a write-back scheme for protocol processing data, in accordance with another alternative embodiment of the invention. In the embodiment of FIG. 7, path 702 (for toPPtx) leads to cache 730 from slow path buffer 712, as in the embodiment of FIG. 2. All data related to frPPrx are cached, instead of being sent to control memory 708, thereby minimizing the frequency of control memory access. The size of cache 730 is increased to (PP_depth+SP_depth+FP_depth). Write-back (e.g., of Type II data) occurs from cache 730 to control memory 708 when the "latest bit" (described above) is set for the Nth entry, where N=(PP_depth+SP_depth). Cache entry insertion and retirement are conducted concurrently, at each end of the cache.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. An apparatus for performing protocol processing, comprising:
a control memory configured to store protocol processing data related to multiple communication connections, including a first communication connection comprising a first transmit flow and a first receive flow;
a hardware protocol processor;
a pre-processing module configured to receive the stored protocol processing data from the control memory and provide the received protocol processing data to the protocol processor;
a post-processing module configured to receive updated protocol processing data from the protocol processor and update the control memory; and
a protocol processing cache local to the hardware protocol processor and separate from the control memory, wherein the cache is configured to store a subset of said protocol Processing data stored in the control memory, including;
a first type of protocol processing data comprising a receive window scaling factor and a maximum segment length;
a second type of protocol processing data comprising a next expected TCP (Transmission Control Protocol) sequence number, a last sequence number sent but not acknowledged and a receive timestamp; and
a third type of protocol processing data comprising the following transmit flow data fields: a starting index of a TCP payload to be included in an outbound packet and an address offset of the payload; and
a header generator configured to generate a protocol header for the outbound packet to facilitate transmission of the outbound packet in the first transmit flow;
wherein said subset of protocol processing data is provided to said header generator by said protocol processing cache and not said control memory.

2. The apparatus of claim 1, further comprising:
a receive module configured to handle a receive flow of a communication connection and provide protocol processing data regarding said receive flow to said pre-processing module.

3. The apparatus of claim 1, further comprising:
a transmit module configured to handle a transmit flow of a communication connection and provide protocol processing data regarding said transmit flow to said pre-processing module.

4. The apparatus of claim 1, wherein said
third type of protocol processing data bypasses the protocol processor.

5. The apparatus of claim 1, wherein said post-processing module comprises said cache.

6. A method of using a protocol processing cache to facilitate generation of a TCP (Transmission Control Protocol) header for an outbound packet, the method comprising:
maintaining a protocol processing cache local to a hardware protocol processor, wherein said cache is separate from a control block memory configured to store protocol processing data for generating a header for a packet to be transmitted within a first communication flow comprising a first transmit flow and a first receive flow;
storing a first type of protocol processing data from the first communication flow in said cache, said first type of data comprising the following:
receive window scaling factor; and
maximum segment length;
storing a second type of protocol processing data from the first communication flow in said cache, said second type of data comprising the following:
next expected TCP sequence number;
last sequence number sent but not acknowledged; and
a receive timestamp;

storing a third type of protocol processing data from the first communication flow in said cache, said third type of data comprising the following transmit flow data fields:
  starting index of TCP payload to be included in the outbound packet; and
  address offset of the payload;
from the protocol processor, signaling a header generator to generate the protocol header for the outbound packet to be transmitted in the first transmit flow; and
providing said first, second and third type of protocol processing data to the header generator from said cache and not from the control block memory.

7. The method of claim 6, further comprising:
storing a fourth type of protocol processing data from the first communication flow in the control block memory but not in said cache, said fourth type of data comprising the following transmit flow data fields:
  urgent pointer;
  previous receive window;
  transmit sequence number; and
  a send timestamp.

8. The method of claim 6, wherein said first type of protocol processing data, said second type of protocol processing data and said third type of protocol processing data are stored in said cache and in the control block memory.

9. The method of claim 6, wherein the most up-to-date versions of said first type, said second type and said third type of protocol processing data for the first communication flow are stored in a single entry in said cache.

10. The method of claim 9, further comprising using said single entry to update a replacement single entry created in preparation for generation of the TCP header for the outbound packet.

11. The method of claim 10, wherein said using comprises:
  reading one or more types of protocol processing data from said single entry;
  creating said replacement single entry; and
  configuring said replacement single entry with said read types of protocol processing data.

12. The method of claim 10, wherein said using comprises:
  reading one or more types of protocol processing data from said single entry;
  updating said read types of protocol processing data for the outbound packet;
  creating said replacement single entry; and
  configuring said replacement single entry with said updated types of protocol processing data.

13. The method of claim 9, further comprising using said single entry to update a replacement single entry created when an inbound packet is received in the first receive flow.

14. The method of claim 13, wherein said using comprises:
  reading one or more types of protocol processing data from said single entry;
  creating said replacement single entry; and
  configuring said replacement single entry with said read types of protocol processing data.

15. The method of claim 13, wherein said using comprises:
  reading one or more types of protocol processing data from said single entry;
  updating said read types of protocol processing data based on the received packet;
  creating said replacement single entry; and
  configuring said replacement single entry with said updated types of protocol processing data.

16. The method of claim 6, wherein the outbound packet is processed through a slow-path of protocol processing and not a fast-path of protocol processing.

17. The method of claim 6, wherein packets in the first transmit flow and the first receive flow are processed through a slow-path of protocol processing and not a fast-path of protocol processing.

18. The method of claim 6, wherein each entry in said cache comprises:
  said first type of protocol processing data for the first communication flow;
  said second type of protocol processing data for the first communication flow;
  said third type of protocol processing data for the first communication flow;
  a latest indicator configured to indicate whether the entry is the most recent entry corresponding to the first communication flow; and
  a tag configured to identify the first communication flow.

19. The method of claim 18, wherein the tag identifies an index of an entry in the control block memory corresponding to the first communication flow.

20. The method of claim 18, wherein each entry in said cache further comprises:
  an acknowledge indicator configured to indicate whether a packet in the first transmit flow was acknowledged in the first receive flow.

21. A computer readable storage medium storing instructions that, when executed by a computer, cause the computer to perform a method of using a protocol processing cache to facilitate generation of a TCP (Transmission Control Protocol) header for an outbound packet, the method comprising:
  maintaining a protocol processing cache local to a hardware protocol processor, wherein said cache is separate from a control block memory configured to store protocol processing data for generating a header for a packet to be transmitted within a first communication flow comprising a first transmit flow and a first receive flow;
  storing a first type of protocol processing data from the first communication flow in said cache, said first type of data comprising the following:
    receive window scaling factor; and
    maximum segment length;
  storing a second type of protocol processing data from the first communication flow in said cache, said second type of data comprising the following:
    next expected TCP sequence number;
    last sequence number sent but not acknowledged; and
    a receive timestamp;
  storing a third type of protocol processing data from the first communication flow in said cache, said third type of data comprising the following transmit flow data fields:
    starting index of TCP payload to be included in the outbound packet; and
    address offset of the payload;
  from the protocol processor, signaling a header generator to generate the protocol header for the outbound packet to be transmitted in the first transmit flow; and
  providing said first, second and third type of protocol processing data to the header generator from said cache and not from the control block memory.

* * * * *